W. H. WHITED & E. N. GILSTRAP.
SAW.
APPLICATION FILED MAR. 15, 1917.
1,286,465.
Patented Dec. 3, 1918.
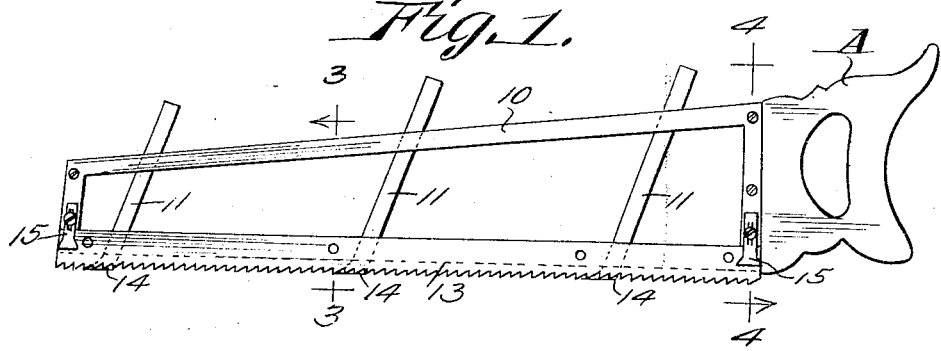
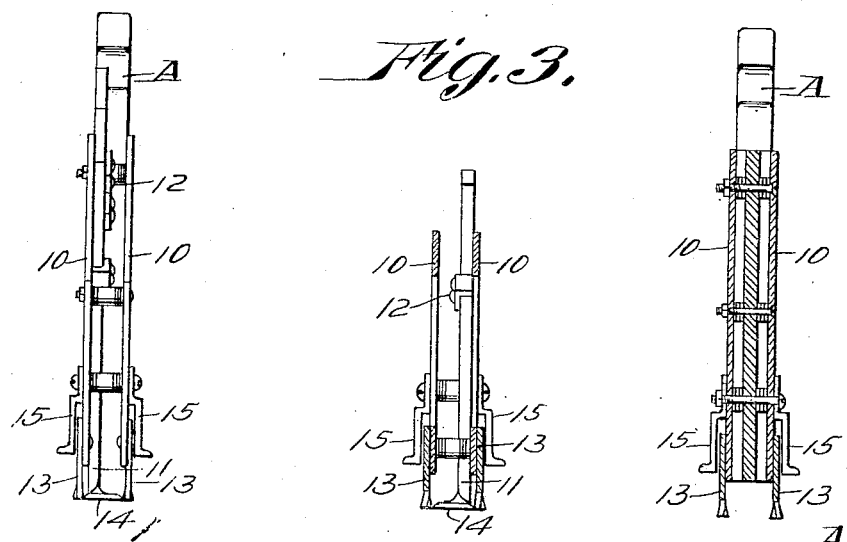
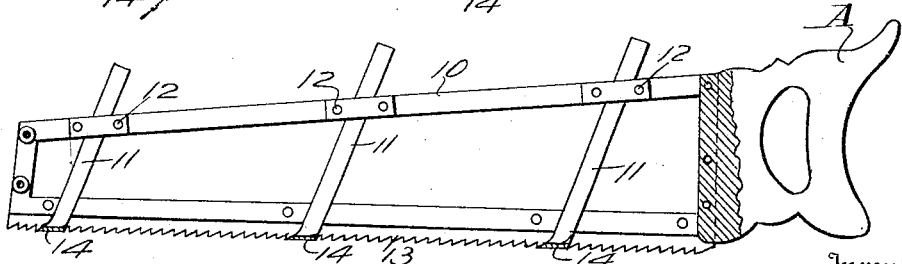
Inventors
W. H. Whited & E. N. Gilstrap,
By Talbert & Parker
Attorneys

UNITED STATES PATENT OFFICE.

WILLIAM H. WHITED AND EDWARD N. GILSTRAP, OF LINCOLN, NEBRASKA.

SAW.

1,286,465.  Specification of Letters Patent.  Patented Dec. 3, 1918.

Application filed March 15, 1917. Serial No. 155,077.

*To all whom it may concern:*

Be it known that we, WILLIAM H. WHITED and EDWARD N. GILSTRAP, citizens of the United States, residing at Lincoln, in the county of Lancaster and State of Nebraska, have invented certain useful Improvements in Saws, of which the following is a specification, reference being had therein to the accompanying drawing.

The invention relates to a saw, and more particularly to the class of mortising tools.

The primary object of the invention is the provision of a tool of this character wherein a rabbet of any depth can be cut in a piece of work, the surfaces of the mortise being rendered smooth and the use of a hand chisel for this purpose avoided.

Another object of the invention is the provision of a tool of this character wherein the depth of cutting action of the saw can be regulated and accurately determined, and the rabbet formed in a single operation of the tool, thereby saving time and labor in the use of the latter.

A further object of the invention is the provision of a tool of this character wherein the construction thereof is novel in form so that it will support the chisels between the blades of the saw for the cutting out of the material between the kerfs formed by the saw blades in a single operation.

A still further object of the invention is the provision of a tool of this character which is simple in construction, thoroughly reliable and efficient in operation and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawing:

Figure 1 is a side elevation of a tool constructed in accordance with the invention;

Fig. 2 is an end elevation;

Fig. 3 is a sectional view on the line 3—3 of Fig. 1;

Fig. 4 is a sectional view on the line 4—4 of Fig. 1;

Fig. 5 is a vertical longitudinal sectional view through the tool.

Similar reference characters indicate corresponding parts throughout the several views of the drawing.

Referring to the drawings in detail, A designates generally the handle of the tool, which carries a pair of frames 10 which are correspondingly shaped with respect to each other and support a series of chisels 11 which are clamped therebetween through one of the medium of bolt members 12 which are passed through the frames to secure suitable clamping members in place.

Mounted on the frames at opposite sides of the chisel 11 are saw blades 13 which are co-extensive with the length of the frames and are adjustable with respect to each other inasmuch as the frames are held together by bolts and spacing, members as shown. Employing various lengths of spacing members with bolts of the requisite length will enable the adjusting of the frames to the desired distance from each other. The cutting blades 14 of the chisels are located within the space between the saw blades 13 for the cutting out of material between the kerfs formed by said saw blades when the tool is operated, thereby providing for the forming in a piece of work in a single operation a rabbet all of whose surfaces are smooth.

On the frames are mounted gages 15 which are adjustable so as to regulate the depth of the cutting action of the saw blades 13 and thus accurately determine the depth of the rabbet formed by the tool.

From the foregoing description, taken in connection with the accompanying drawings, the construction and operation of the herein described tool will be readily apparent and, therefore, a more extended explanation has been omitted.

Having thus described our invention, we claim:

A tool of the kind described comprising a pair of open frames, spacers and bolts by means of which the frames are connected together in spaced relation, a saw blade carried by each frame, and chisels clamped to one of the frames and carried between the frames with their cutting edges lying between and adjacent to the cutting edges of the saw blades.

In testimony whereof we affix our signatures.

W. H. WHITED.
EDWARD N. GILSTRAP.

Copies of this patent may be obtained for five cents each, by addressing the "Commissioner of Patents, Washington, D. C."